US007554590B2

(12) United States Patent
McCaffrey et al.

(10) Patent No.: US 7,554,590 B2
(45) Date of Patent: Jun. 30, 2009

(54) SIMULTANEOUS READOUT OF CMOS APS IMAGERS

(75) Inventors: Nathaniel Joseph McCaffrey, Stockton, NJ (US); Peter Zalud, New Hope, PA (US); Peter Levine, West Windsor, NJ (US); Gary Hughes, Westlake Village, CA (US)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 809 days.

(21) Appl. No.: 10/744,566

(22) Filed: Dec. 23, 2003

(65) Prior Publication Data

US 2004/0189844 A1  Sep. 30, 2004

Related U.S. Application Data

(60) Provisional application No. 60/450,090, filed on Feb. 26, 2003.

(51) Int. Cl.
*H04N 3/14* (2006.01)
*H04N 5/335* (2006.01)
*H04N 9/04* (2006.01)
*H04N 9/083* (2006.01)

(52) U.S. Cl. ....................... 348/308; 348/280
(58) Field of Classification Search ................. 348/305, 348/266, 272, 273, 280, 281, 302, 308, 295
See application file for complete search history.

(56) References Cited

U.S. PATENT DOCUMENTS

| 3,982,274 | A | * | 9/1976 | Chai ........................ 348/280 |
| 4,117,510 | A | * | 9/1978 | Ohta et al. ................ 348/281 |
| 4,330,796 | A | * | 5/1982 | Anagnostopoulos et al. ......................... 348/322 |
| 4,580,170 | A | * | 4/1986 | Levine ...................... 348/317 |
| 4,697,208 | A | * | 9/1987 | Eino ......................... 348/266 |
| 4,809,075 | A | | 2/1989 | Akimoto et al. ......... 358/213.18 |
| 4,835,617 | A | | 5/1989 | Todaka et al. .......... 358/213.13 |

(Continued)

*Primary Examiner*—Lin Ye
*Assistant Examiner*—Jason Whipkey
(74) *Attorney, Agent, or Firm*—Saile Ackerman LLC; Stephen B. Ackerman; Larry J. Prescott

(57) ABSTRACT

A new method of reading an imager is achieved. The method comprises providing an imager array comprising n rows and m columns where a pair of rows can be read during a single row access time. A first image field is completed by sequentially reading and storing pixel values of pairs of adjacent rows of the imager array. The reading begins at a first row, and the reading stops when less than three rows are unread. Thereafter pixel values of the next row are read and not stored. Thereafter pixel values of the first row of the imager array are read and not stored. A second image field is completed by sequentially reading and storing pixel values of pairs of adjacent rows. The reading begins at the second row, the reading stops when less than two rows are unread.

19 Claims, 9 Drawing Sheets

U.S. PATENT DOCUMENTS

| | | | |
|---|---|---|---|
| 5,187,584 A * | 2/1993 | Nishiki et al. | 348/305 |
| 5,264,939 A * | 11/1993 | Chang | 348/322 |
| 5,278,660 A * | 1/1994 | Sugiki | 348/305 |
| 5,430,499 A * | 7/1995 | Asada et al. | 348/252 |
| 5,742,325 A | 4/1998 | Curry et al. | 347/251 |
| 6,038,067 A * | 3/2000 | George | 359/368 |
| 6,198,507 B1 * | 3/2001 | Ishigami | 348/273 |
| 6,243,100 B1 | 6/2001 | Curry et al. | 345/433 |
| 6,289,139 B1 | 9/2001 | Chen et al. | 382/312 |
| 6,529,239 B1 * | 3/2003 | Dyck et al. | 348/277 |
| 6,795,119 B1 * | 9/2004 | Oda et al. | 348/273 |
| 7,034,868 B2 * | 4/2006 | Sasaki | 348/305 |
| 7,218,348 B2 * | 5/2007 | Misawa | 348/273 |
| 2003/0048368 A1 * | 3/2003 | Bosco et al. | 348/272 |
| 2003/0052974 A1 * | 3/2003 | Glenn | 348/207.99 |

* cited by examiner

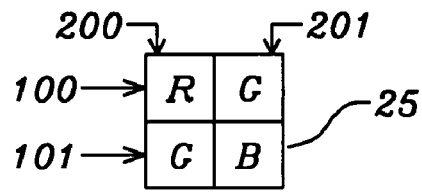
FIG. 2 – Prior Art
FIG. 3 – Prior Art

SIMULTANEOUS READOUT OF CMOS APS IMAGERS

This application claims priority to U.S. Provisional Application serial No. 60/450,090 filed on Feb. 26, 2003, and herein incorporated by reference.

BACKGROUND OF THE INVENTION (1) Field of the Invention

The invention relates to imaging arrays, and, more particularly, to a method to an imager having dual row access capability.

(2) Description of the Prior Art

Standard CMOS Active Pixel Sensors (APS) utilize a row scanning architecture for addressing pixel data and for generating an image frame. By sequentially scanning each row of the imager, a full image is generated in what is known as a progressive scan format. Color images use standard mosaic filter patterns that are placed directly over the imaging pixels to break up the image into its basic color components. Primary color filters break up the image into the red, green, and blue components while complimentary filters break up the image into yellow, cyan, and magenta components.

Standard patterns are commonly used to enable standardized production methods to be used. The most common standardized pattern is the Bayer pattern 25 shown in FIG. 2. As shown in FIG. 2, the Bayer pattern is an array comprising 2×2 pixel sub-arrays. Each 2×2 sub-array 25 comprises, from left to right, a red pixel followed by a green pixel in the first row 100 and, from left to right, a green pixel followed by a blue pixel, in the second row 101. This arrangement, in turn, results in, from top to bottom, a red pixel followed by a green pixel in the first column 200, and, from top to bottom, a green pixel followed by a blue pixel in the second column 201. This 2×2 sub-array 25 is repeated many times to create a large imager pixel array such as is shown in FIG. 3.

To correctly recreate the color image instant upon the imager array at a first pixel, it is necessary to combine, in proper proportions, the signal at the first pixel with a second and a third pixel. Specifically, the color signals from second and third pixels adjacent to an arbitrary chosen first pixel supply the additional color signals necessary to correctly demultiplex the first pixel color signal. If, for example, the first pixel is a green filtered pixel, then the color signals from the adjacent blue and red filtered pixels would be proportionally combined with the green pixel signal to correctly recreate the color for the green pixel location. It can be readily seen from the array configurations of FIGS. 2 and 3 that the color pixel signals from two lines or rows of the array are needed to fully recreate or demultiplex any given pixel.

Most CMOS imagers utilize either a random y or a random x and y addressing architecture. These architectures allow the imagers to be read using either progressive or interlaced scanning methods. These imagers allow a single line of pixels to be read on any single access. A row or line is selected and then read. Successive line reads are then performed to build a frame. In order to achieve full color reproduction from an imager, the current imager line data must be combined with a previously read line as discussed above. Therefore, a memory must be used to store the results of previous imager line reads so that they can be combined with current data.

Several prior art inventions relate to methods to read or to manipulate image data. U.S. Pat. No. 5,742,325 to Curry et al describes a printer apparatus for rendering image data on a recording medium. Two channels are used to read data such that data can be further processed according to one of two methods: half-toning for picture data and thresholding for line art or text. U.S. Pat. No. 6,243,100 B1 to Curry et al teaches an imager processing system for interpolation performance.

SUMMARY OF THE INVENTION

A principal object of the present invention is to provide an effective and very manufacturable method to read a dual row read-capable CMOS imager.

A further object is to provide a method to perform color readout of interlaced scans on a dual read CMOS imager without requiring off-chip storage of line, field, or frame data.

A further object of the present invention is to provide a method to double the frame rate of a dual read per column CMOS imager.

A yet further object of the present invention is to provide additional image process functionality using a dual line read CMOS imager.

In accordance with the objects of this invention, a method of reading an imager is achieved. The method comprises providing an imager array comprising n rows and m columns where a pair of rows can be read during a single row access time. A first image field is completed by sequentially reading and storing pixel values of pairs of adjacent rows of the imager array. The reading begins at a first row, and the reading stops when less than three rows are unread. Thereafter pixel values of the next row are read and not stored. Thereafter pixel values of the first row of the imager array are read and not stored. A second image field is completed by sequentially reading and storing pixel values of pairs of adjacent rows. The reading begins at the second row, the reading stops when less than two rows are unread.

Also in accordance with the objects of this invention, a method of reading an image field of an imager array is achieved. The method comprises providing an imager array comprising n rows and m columns. A pair of rows can be read during a single row access time. An image field is completed by a method comprising reading and storing a string of pixel values for a pair of rows. The pixel values are copied for a first row of the pair from the pixel string to a first row register in an order corresponding to the columns. The pixel values are copied for a second row of the pair from the pixel string to a second row register in the order corresponding to the columns. The steps of reading and storing, copying the pixel values for a first row of the pair, and copying the pixel values for a second row of the pair are repeated for all the rows of the imager array.

Also in accordance with the objects of this invention, a method of reading an imager is achieved. The method comprises providing an imager array comprising n rows and m columns where a pair of the rows can be read during a single row access time. A first image field is completed by sequentially reading and storing pixel values of pairs of even numbered rows of the imager array. The reading begins at a first even numbered row, and the reading stops when all the even numbered rows have been read. A second image field is completed by sequentially reading and storing pixel values of pairs of adjacent rows where the reading begins at row 1 and where the reading stops when row n has been read.

BRIEF DESCRIPTION OF THE DRAWINGS

In the accompanying drawings forming a material part of this description, there is shown:

FIG. 2 illustrates basic Bayer pattern, 2×2 imager sub-array.

FIG. 3 illustrates a Bayer pattern, 8-row×12-column imager array for color imaging.

DESCRIPTION OF THE PREFERRED EMBODIMENTS

The preferred embodiments of the present invention disclose several methods to read a CMOS imager capable of dual row reading. It should be clear to those experienced in the art that the present invention can be applied and extended without deviating from the scope of the present invention.

Figure 1:
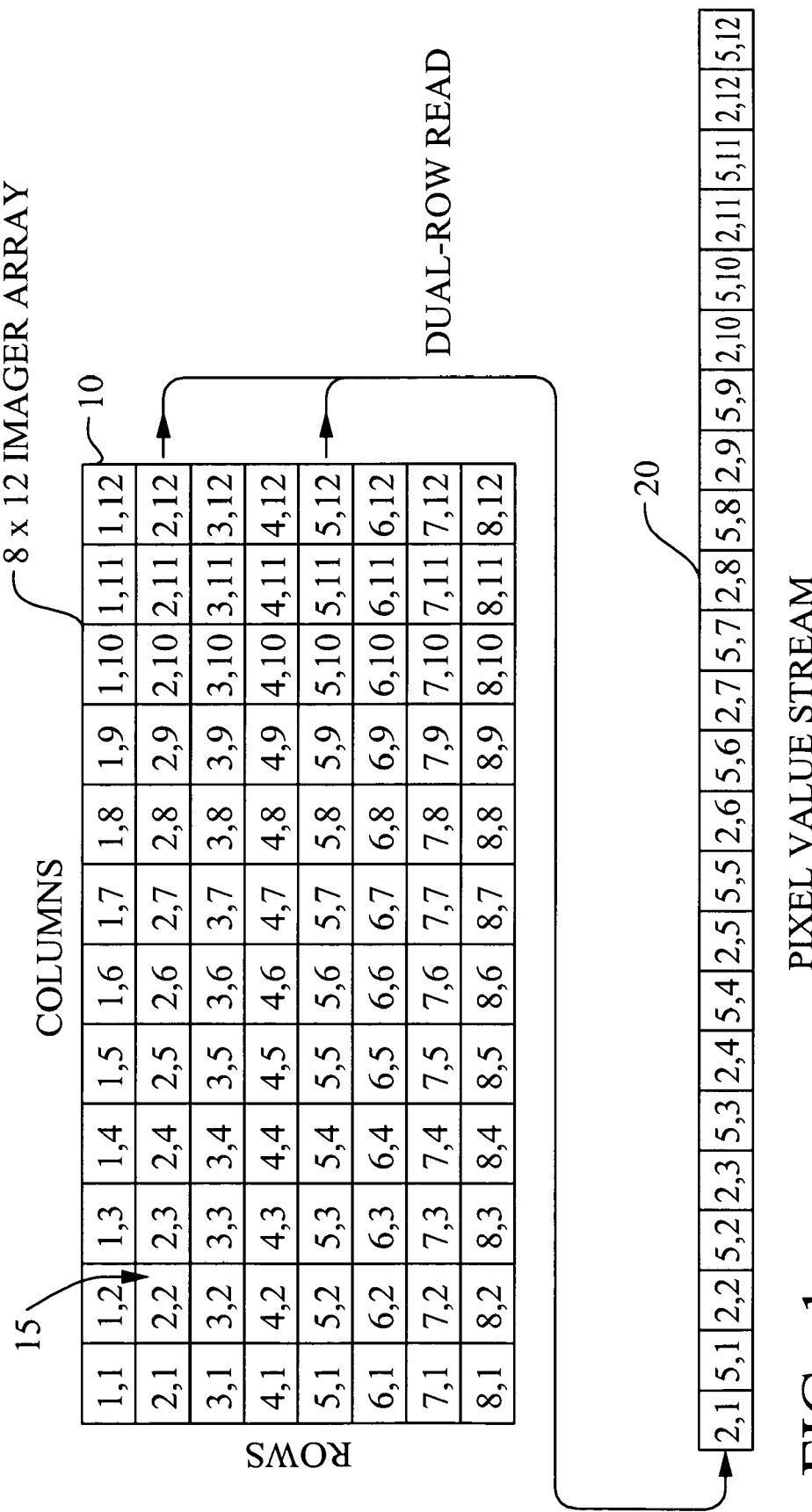
FIG. 1 illustrates a CMOS imager array with dual row read per row access capability.

Referring now to FIG. 1, an imager array 10 is illustrated. Of particular importance, this imager array 10 has a dual row reading capability. In a typical imager, an array of pixels is arranged as n-row and m-columns. Each pixel senses incident light and converts the light energy into a voltage signal. The imager uses an analog-to-digital converter (ADC) to convert pixel voltages into digital data. Typically, a row of pixels can be read on any given access. During a read, the analog-to-digital conversion is performed for each pixel in the row. The digital values of each pixel in the row is then read out through a data bus as a string of data.

In the present invention, several unique methods are disclosed to read a dual row read-capable imager. In a dual row read-capable imager, each row access to the imager performs an analog-to-digital conversion and a data streaming for two rows of the imager rather than a single row. For example, the APS75 CMOS imager from the Sarnoff Corporation contains two outputs designed to provide for the readout of a pixel in two portions. Two identical correlated, double sampling circuits (CDS) are provided for each column and two separate analog-to-digital converters are provided for conversion of two rows simultaneously. The two samples are time division multiplexed (TDM) to provide an output at twice the horizontal clock output. This architecture can be exploited to perform dual row readouts, rather than pixel signal partitioning, to thereby allow for several unique imaging methods that are disclosed in the present invention. The methods are applied to both color and gray-scale imagers.

Referring again to FIG. 1, the dual row readout capable, imager array 10 is shown in simplified form. Here, the array 10 is shown as an n-row by m-column array where n=8 and m=12. Each pixel 15 can be located as a row, column coordinate as shown. Of particular importance to the present invention, the imager array 10 can be accessed using a single dual-row read to produce a single pixel value stream 20 as shown. In this example, row 2 and row 5 are selected for reading as a row pair. The pixel values are presented to the imager data bus output at twice the rate of the horizontal clock signal. In this way, it is possible to read out two rows of data in the time required for a single row access in a traditional imager.

A first preferred embodiment of the present invention comprises a unique method to read and to process a dual-read capable imager for a color image. A basic Bayer sub-array 25 has been described above and is illustrated in FIG. 2. The Bayer pattern comprises a 2×2 pixel array 25 of, from left to right, a red pixel followed by a green pixel in the first row 100 and, from left to right, a green pixel followed by a blue pixel, in the second row 101. This arrangement, in turn, results in, from top to bottom, a red pixel followed by a green pixel in the first column 200, and, from top to bottom, a green pixel followed by a blue pixel in the second column 201. This 2×2 sub-array is repeated many times to create a large imager pixel array such as is shown in FIG. 3. Referring again to FIG. 3, an imager array of pixels arranged in the Bayer pattern is shown. The array shown in this example is an 8-row×12-column array having eight rows: R1-R8 and 12-columns: C1-C12.

Figure 4:
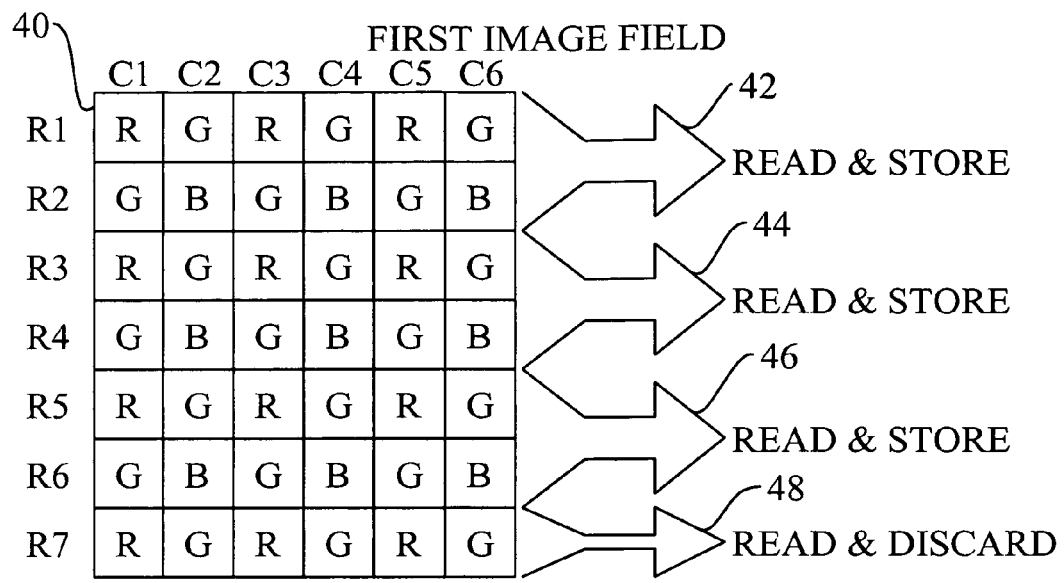
FIG. 4 illustrates a first preferred embodiment of the present invention showing a method to read a dual row read imager where the imager comprises an odd number of rows.
Figure 5:
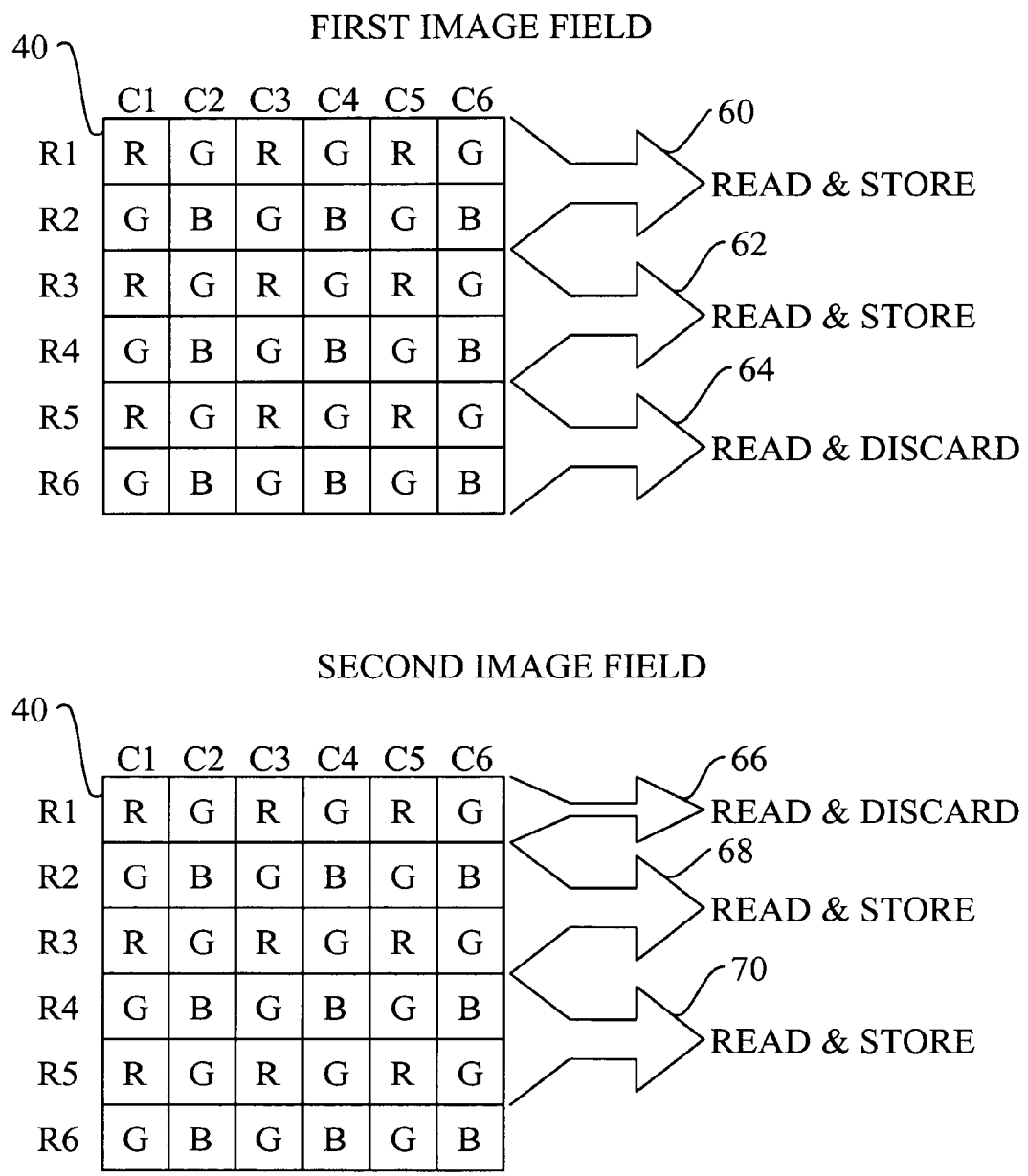
FIG. 5 illustrates the first preferred embodiment of the present invention showing a method to read a dual row read imager where the imager comprises an even number of rows.

Referring now to FIGS. 4 and 5, the first preferred embodiment is illustrated in schematic form. In this method, an imager array 40 comprises n rows and m columns. In this example, n=7 and m=6. In practice, much larger arrays comprising many thousands of pixels are used. Of importance, this imager array 40 is of the type where a pair of rows can be read during a single row access time. As a first major step, a first image field is completed by sequentially reading and storing pixel values 42, 44, and 46 of pairs of adjacent rows (R1 and R2, R3 and R4, R5 and R6) of the imager array 40. The reading begins at a first row (R1), and the reading stops when less than three rows are unread. In other words, if there are only one or two rows left to read, then the process of reading and storing data stops. In this case, the last row (R7) remains after the read and store of rows R5 and R6. Row R7 is the next row, and it is read 48. However, the pixel values of the row R7 row are not stored 48. At this point, a first image field of data has been read and stored.

Prior to reading the second image field, the first row R1 of the array is read and is discarded 50. A second image field is completed by sequentially reading and storing pixel values 52 and 54 of pairs of adjacent rows. The reading of the second image field begins at the second row R2. The reading stops when less than two rows are unread. In this case, row pairs R2 and R3, and R4 and R5 are read and stored 52 and 54. The last row pair R6 and R7 are read but discarded.

This method of reading the imager array results in two image fields: a first image field and a second image field. Since two adjacent rows are read simultaneously during a single read time, adjacent rows, Rn and Rn+1, are read out simultaneously using the dual readout structure. The red, green, and blue signals are then available in columns Cm and Cm+1, permitting full color reproduction of the image detected by the imager. The method of this invention requires a dual readout structure to provide two lines in parallel at the imager output. However, it does not require line or frame memories.

The imager array 40 does require a color filter array as shown. The color filter array overlies the imager array. One of the color filter types overlies each pixel in the imager array 40. In this case, a Bayer pattern is used with three color filter types: red, green, and blue. To convert the first and second image fields into a color image, the pixel value of a first pixel having a first filter type is proportionally combined with the pixel values of a second pixel having a second type of filter and of a third pixel having a third type of filter. The configuration of the Bayer pattern allows adjacent pixels to be of each of the three types. By reading the first and second image fields using the dual row accesses as shown in FIG. 4, data for the entire array is available for color conversion at twice the horizontal clock rate. It should be further noted that an equal number of row accesses is used for each image field. This allows for an equal integration time for each image field. This is why some rows are read and then discarded such as row R7 in the first field and rows 1, and 6 and 7 in the second field.

In the example of FIG. 4, the imager has an odd number of rows (n=7). If the imager has an even number of rows, the method would appear as shown in FIG. 5. In this case, the array 40 has an even number of rows (n=6). The first field requires three reads 60, 62, and 64, and the second field requires three reads 66, 68, and 70. Again, the integration times for the first and second image fields are kept the same using "read & discard" steps 64 and 66. Using the first embodiment method, the sequential fields (first and second) are made up of interlaced scans that are offset by one row and that are readout one field time from each other.

Figure 6:
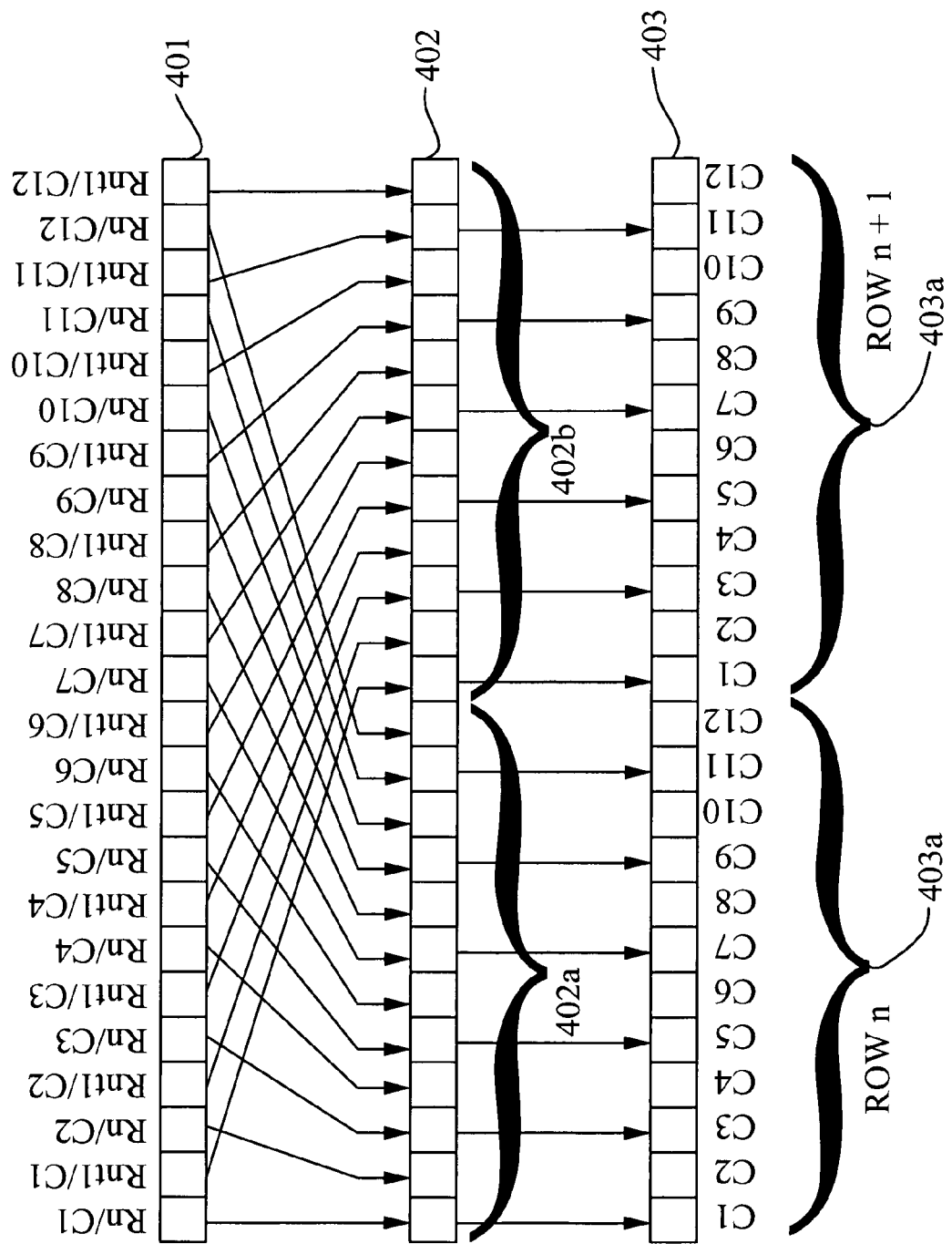
FIG. 6. illustrates a second preferred embodiment of the present invention showing how pixel values for each row of the dual row access pair are preferably remapped.

Referring now to FIGS. 6 through 9, a second preferred embodiment of the present invention is illustrated. Referring particularly to FIG. 6, a pixel value bit stream 401 is generated from the dual row access of the imager. The bit stream 401 comprises a data value (byte or word) for each bit of each of the two rows. In general, the first row can be labeled Rn, and the second row can be labeled Rn+1. In the Sarnoff Corporation APS75 CMOS imager, the pixel bit stream presents the converted pixel values in alternating fashion. In particular, the pixel values are presented in ascending order from column 1 to column n and are presented alternating between the first row Rn and the second row Rn+1 of the pair. Therefore, the first data value is Rn/C1, the second data value is Rn+1/C1, the third value is Rn/C2, and so on. It is useful for the second preferred embodiment to re-map the data values such that the first half of the re-mapped bit stream 402 comprises the Row n data, from column 1 to column n, and the second half of the re-mapped bit stream comprises the Row n+1 data from column 1 to column n.

Another useful feature of this method are display registers 403a and 403b for the re-mapped first and second rows, respectively. The two re-mapped lines are transferred from the re-mapped registers 402a and 402b to the two-line storage element 403a and 403b for display. While the next two lines are being reconstructed, the previous two lines are read out from the previous line. Therefore, the display rate is two times the imager line pair addressing rate. The imager can operate at normal horizontal readout rates by employing a dual horizontal readout to effectively double the imager pixel readout rate.

An image field is completed by the second embodiment method by reading and storing a string 401 of pixel values for a pair of rows. Then, the pixel values are copied for a first row of the pair from the pixel string to a first row register 402a in an order corresponding to the columns. The pixel values are copied for a second row of the pair from the pixel string to a second row register 402b in the order corresponding to the columns. The steps of reading and storing, copying the pixel values for a first row of the pair, and copying the pixel values for a second row of the pair are repeated for all the rows of the imager array. These steps are repeated according to any of several possible patterns as shown in FIGS. 7, 8, and 9.

Figure 7:
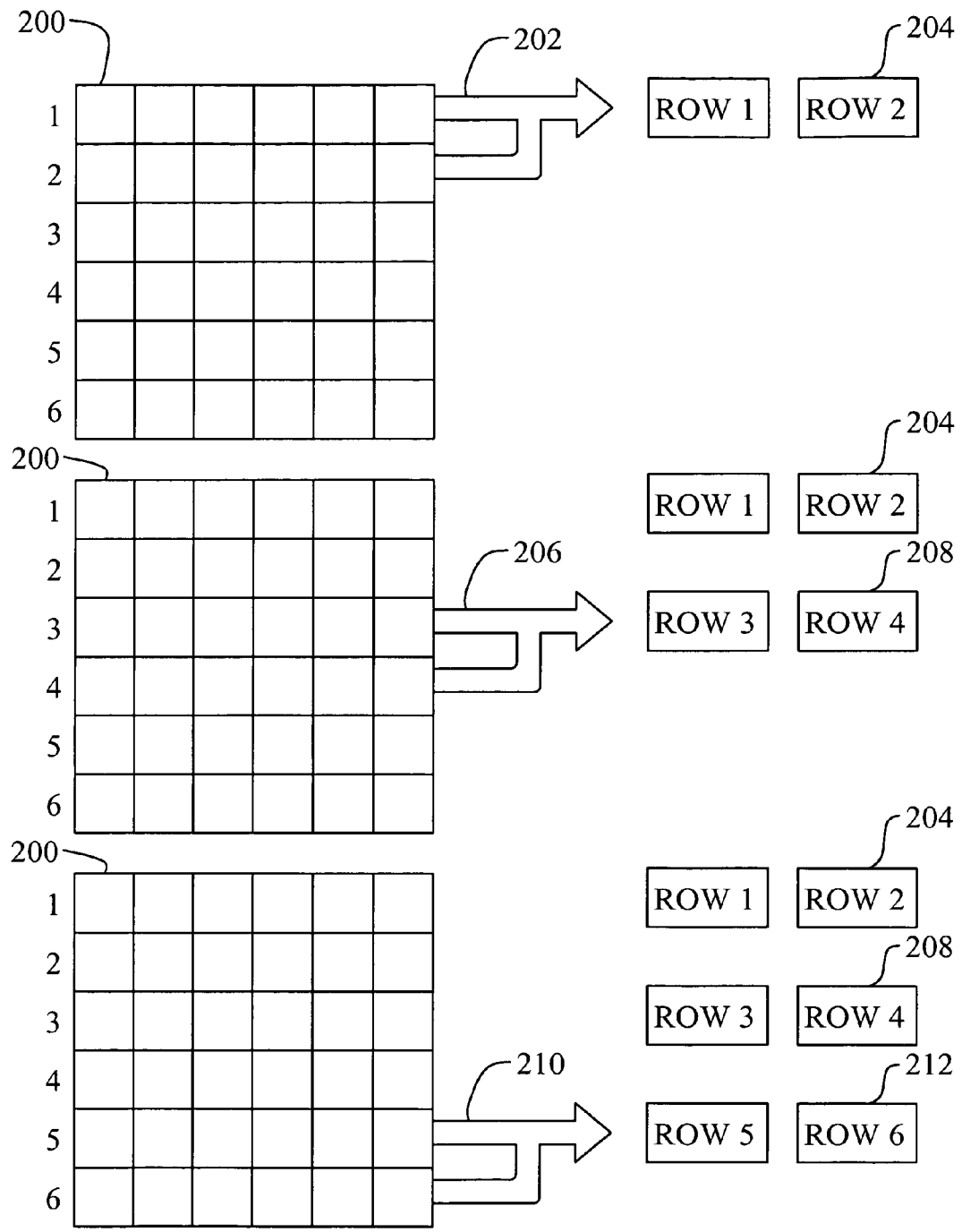
FIGS. 7 through 9 illustrates the second preferred embodiment of the present invention for reading an imager array having dual row read capability and showing alternative methods for scanning the imager.

In particular, FIG. 7 shows how this method of reading and remapping the pixel data stream can be used to simply index down the imager 200. The first two rows are read and remapped to the registers 204 in a first access 202. Access continues 206 and 208 to fill the registers 208 and 212 with the remaining rows until row n is read. As each new re-mapping is performed to fill the row registers 204, 208, and 212, the data can be further shifted to the display registers, not shown, so that a continuous display of image data can be achieved at twice the horizontal clock rate. In this progressive scan readout, the entire image frame can be readout in line pairs in half the time of a single row access imager. In addition, each paired readout has an identical integration time. Therefore, if motion occurs, the displacement of an object in the scan will occur every other line instead of on each line.

Figure 8:
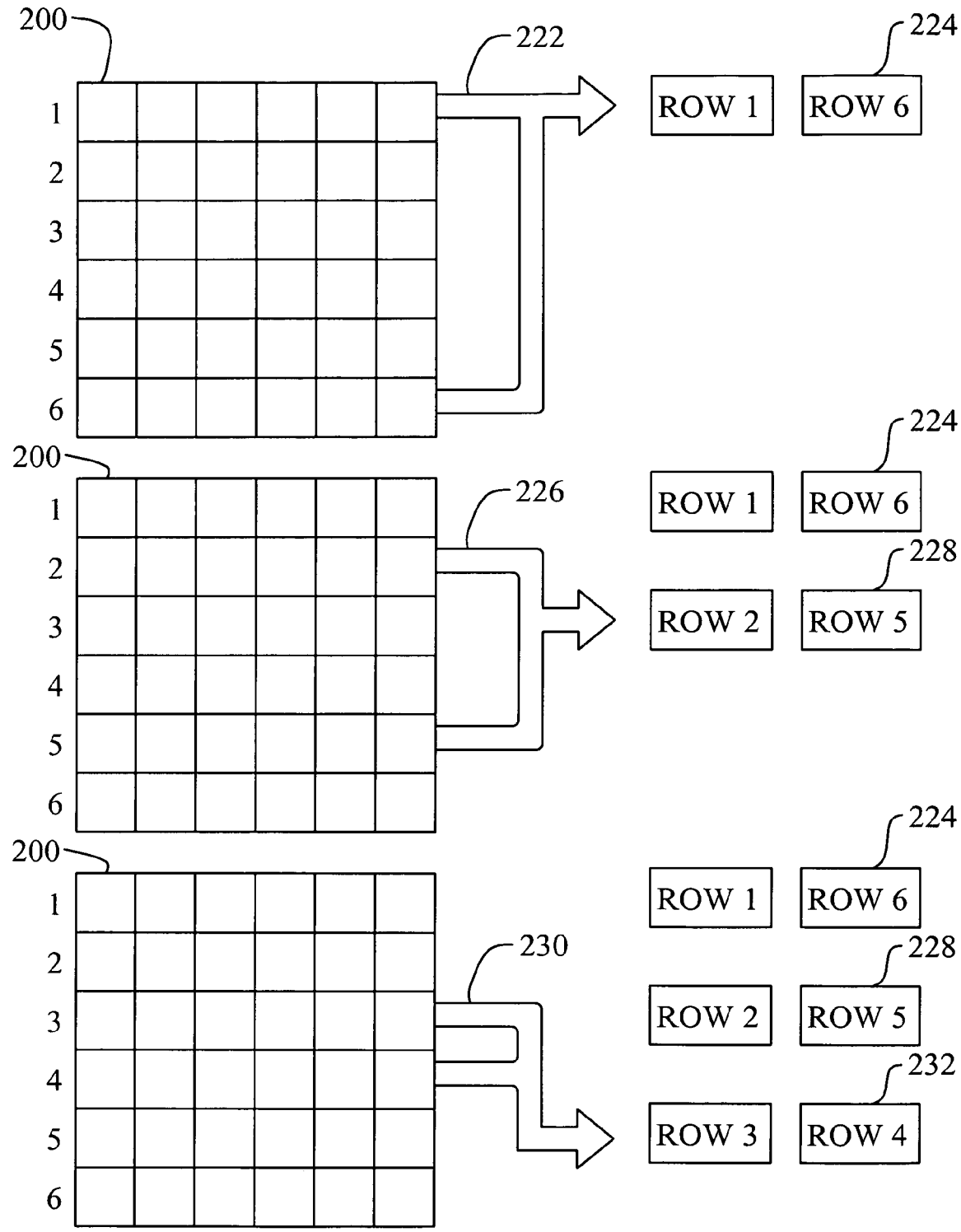
Figure 9:
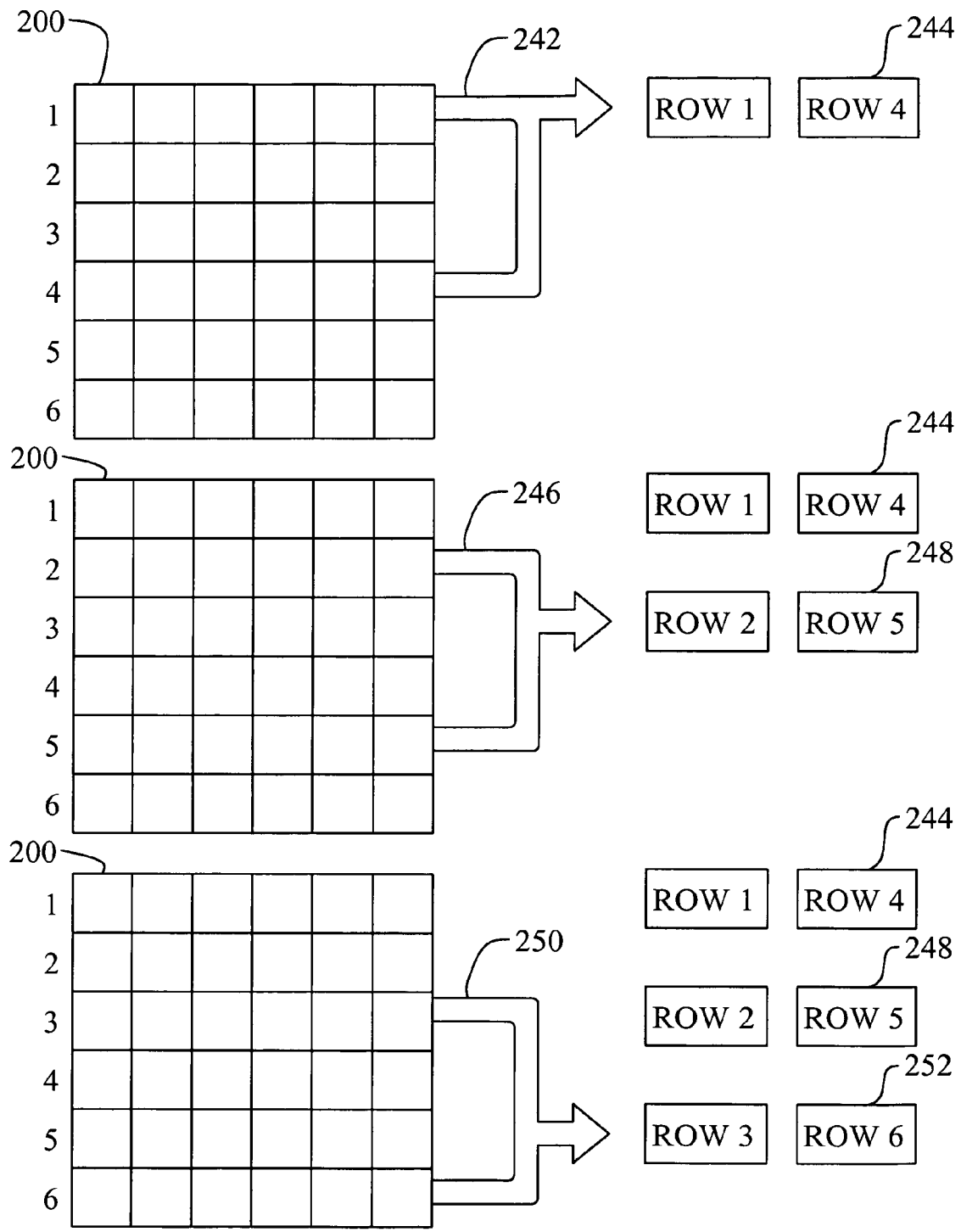

Referring now to FIG. 8, the second embodiment is used to scan the imager 200 from the upper and lower edges and toward the center. In this case, the first read and re-mapping 222 is of rows 1 and n to store first values 224. Subsequent reads 226 generate store values 228 and move toward the middle of the array such that the last read and re-map 230 is of row n/2 and row (n/2)+1 to generate the last stored values 232. Referring now to FIG. 9, the second embodiment is used to scan the imager 200 as an upper half section and a lower half section. In this case, the first read and re-mapping 242 is of rows 1 and (n/2)+1 to store first values 244. Subsequent reads 246 generate store values 248 and move downward on the array such that the last read and re-map 250 is of row n/2 and row n to generate the last stored values 252.

Figure 10:
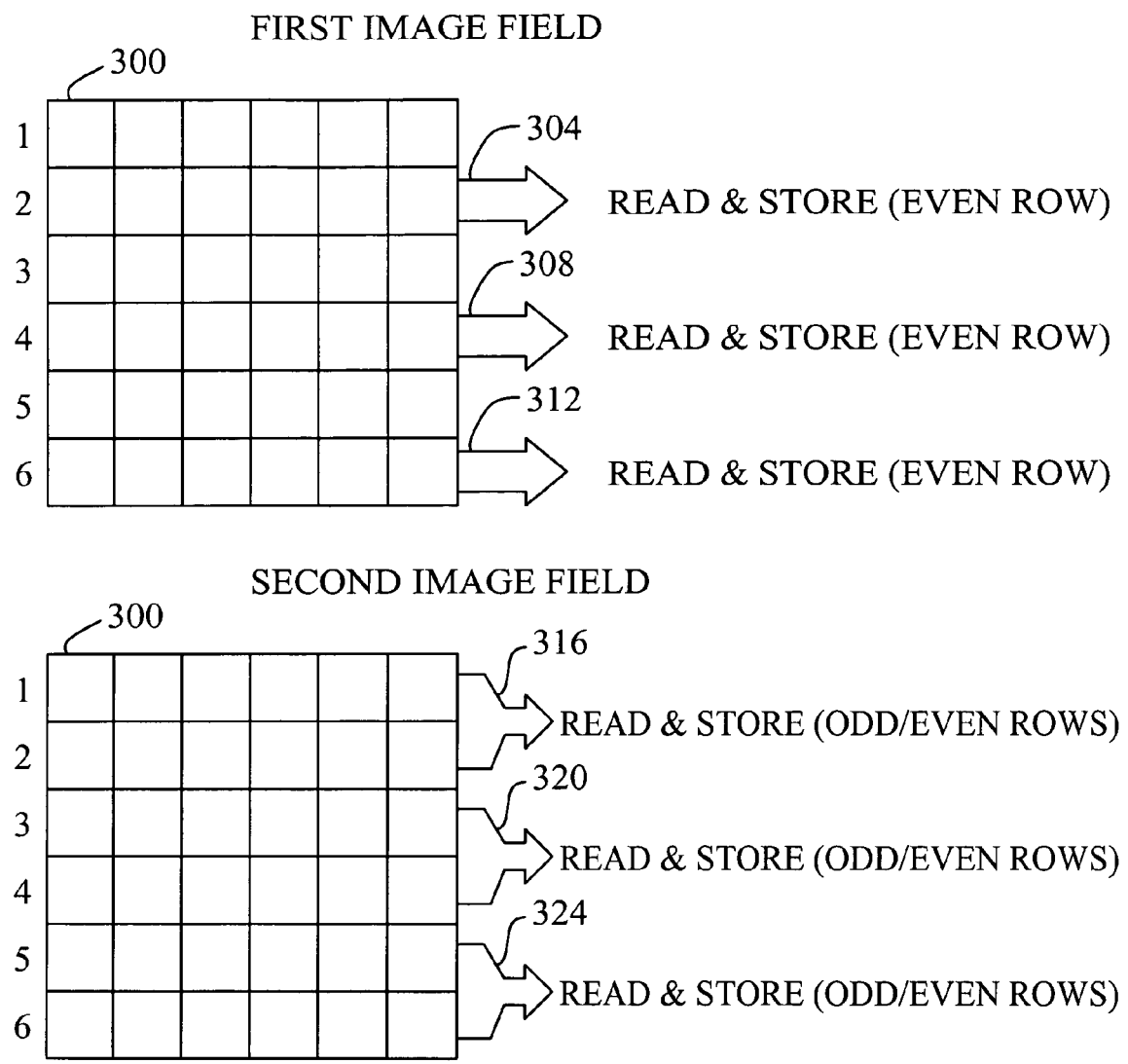
FIG. 10 illustrates a fourth preferred embodiment of the present invention for reading an imager array where a part of the image field has an increased dynamic range.

Referring now to FIG. 10, a third preferred embodiment of the present invention is illustrated. Any arbitrary pattern of paired dual line readouts can be used with the imager 300 designed with this dual line/column readout architecture. In this case, the line pairs do not need to have the same optical integration time. In particular, in the third embodiment a first image field is completed by sequentially reading and storing 304, 308, and 312 pixel values of pairs of even numbered rows of the imager array 300. The reading begins at a first even numbered row (row 2), and the reading stops when all the even numbered rows have been read (at row n if even array or n−1 if odd array). A second image field is completed by sequentially reading and storing 316, 320, and 324 pixel values of pairs of adjacent rows where the reading begins at row 1 and where the reading stops when row n has been read (at row n−1 for an even array).

In the third embodiment, as shown, the first image field only contains the even rows while the second image field contains both the even and odd rows. It is possible, using this method, to extend the dynamic range of the imager. Off-chip processing can generate an image with extended dynamic range where the data is updated every frame. Only the even rows are updated every frame while the odd rows (which can represent the darker portions of the scene) are updated every other frame.

The advantages of the present invention may now be summarized. An effective and very manufacturable method to read a dual row read-capable CMOS imager is achieved. A method to perform color readout of interlaced scans on a dual read CMOS imager without requiring off-chip storage of line, field, or frame data is achieved. A method to double the frame rate of a dual read per column CMOS imager is achieved. Additional image process functionality using a dual line read CMOS imager is provided.

As shown in the preferred embodiments, the novel methods of the present invention provide an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A method of reading an imager, comprising:

providing an imager array comprising n rows and m columns wherein a pair of said rows can be read during a single row access time and output a single stream of pixel values from two rows of said imager which can be stored using a single storage register;

completing a first image field by sequentially reading and storing pixel values of pairs of adjacent said rows of said imager array wherein said reading begins at a first said row and wherein said reading stops when less than three said rows are unread;

thereafter reading and not storing pixel values of next said row;

thereafter reading and not storing pixel values of said first row of said imager array; and completing a second image field by sequentially reading and storing pixel values of pairs of adjacent said rows wherein said reading begins at second said row and wherein said reading stops when less than two said rows are unread.

2. The method according to claim 1 wherein said step of reading and not storing pixel values of next said row comprises reading a pair of adjacent said rows starting with said next row.

3. The method according to claim 1 wherein said imager array further comprises a color filter array.

4. The method according to claim 3 further comprising the step of completing a color image field by combining said first image field and said second image field.

5. The method according to claim 3 wherein said color filter array comprises three filter types.

6. The method according to claim 5 wherein said three color filter types comprise red, green, and blue.

7. The method according to claim 5 wherein said three color filter types are arranged such that each pixel of said imager array is filtered by one of said color filter types and wherein any said pixel that is filtered by a first said color filter type has complimentary said pixels comprising a first adjacent said pixel that is filtered by a second said color filter type and has a second adjacent said pixel that is filtered by a third said color filter type.

8. The method according to claim 7 further comprising the step of completing a color image field comprising an array of color pixel values wherein each said color pixel value is determined by combining said value of said pixel with said values of said complimentary pixels.

9. The method according to claim 1 wherein said first and second image fields comprise equal integration times.

10. A method of reading an imager, comprising:

providing an imager array comprising n rows and m columns wherein a pair of said rows can be read during a single row access time and output a single stream of pixel values from two rows of said imager which can be stored using a single storage register and wherein a color filter array overlies said imager array;

completing a first image field by sequentially reading and storing pixel values of pairs of adjacent said rows of said imager array wherein said reading begins at a first said row and wherein said reading stops when less than three said rows are unread;

thereafter reading and not storing pixel values of next said row;

thereafter reading and not storing pixel values of said first row of said imager array;

completing a second image field by sequentially reading and storing pixel values of pairs of adjacent said rows wherein said reading begins at second said row and wherein said reading stops when less than two said rows are unread; and completing a color image field by combining said first image field and said second image field.

11. The method according to claim 10 wherein said step of reading and not storing pixel values of next said row comprises reading a pair of adjacent said rows starting with said next row.

12. The method according to claim 10 wherein said color filter array comprises three filter types.

13. The method according to claim 12 wherein said three color filter types comprise red, green, and blue.

14. The method according to claim 12 wherein said three color filter types are arranged such that each pixel of said imager array is filtered by one of said color filter types and wherein any said pixel that is filtered by a first said color filter type has complimentary said pixels comprising a first adjacent said pixel that is filtered by a second said color filter type and has a second adjacent said pixel that is filtered by a third said color filter type.

15. The method according to claim 14 wherein said step of completing a color image field comprises combining said value of said pixel with said values of said complimentary pixels.

16. The method according to claim 10 wherein said first and second image fields comprise equal integration times.

17. A method of reading an imager, comprising:

providing an imager array comprising n rows and m columns wherein a pair of said rows can be read during a single row access time and output a single stream of pixel values from two rows of said imager which can be stored using a single storage register;

completing a first image field by sequentially reading and storing pixel values of pairs of even numbered said rows of said imager array wherein said reading begins at a first said even numbered row and wherein said reading stops when all said even numbered rows have been read; and completing a second image field by sequentially reading and storing pixel values of pairs of adjacent said rows wherein said reading begins at row 1 and wherein said reading stops when row n has been read.

18. The method according to claim 17 further comprising displaying said first and second image fields such that said even numbered rows are updated every frame and such that odd numbered said rows are updated every other frame.

19. The method according to claim 17 wherein said first and second image fields comprise integration times.

* * * * *